(12) United States Patent
Schlesier et al.

(10) Patent No.: US 9,328,668 B2
(45) Date of Patent: May 3, 2016

(54) COMBINED CYCLE POWER PLANT BLACK START METHOD WHERE STEAM TURBINE PROVIDES INCREASE IN DEMANDED LOAD

(75) Inventors: Jan Schlesier, Wettingen (CH); Hamid Olia, Zürich (CH); Martin Schoenenberger, Zürich (CH); Martin Liebau, Baden (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 483 days.

(21) Appl. No.: 13/600,965

(22) Filed: Aug. 31, 2012

(65) Prior Publication Data

US 2013/0145772 A1 Jun. 13, 2013

(30) Foreign Application Priority Data

Sep. 7, 2011 (EP) .................................... 11180391

(51) Int. Cl.
| | |
|---|---|
| F02C 9/00 | (2006.01) |
| F02C 6/18 | (2006.01) |
| F22B 1/18 | (2006.01) |
| F01K 13/02 | (2006.01) |
| F01K 23/10 | (2006.01) |

(52) U.S. Cl.
CPC . F02C 9/00 (2013.01); F01K 13/02 (2013.01); F01K 23/10 (2013.01); F01K 23/101 (2013.01); F02C 6/18 (2013.01); F22B 1/1815 (2013.01); *Y02E 20/14* (2013.01); *Y02E 20/16* (2013.01)

(58) Field of Classification Search
CPC ........... F01K 23/10; F02C 6/18; Y02E 20/16; F22B 1/1815
USPC ................................ 60/39.182, 772, 778, 773
See application file for complete search history.

(56) References Cited

U.S. PATENT DOCUMENTS

| | | | |
|---|---|---|---|
| 4,589,255 A * | 5/1986 | Martens et al. | ................. 60/646 |
| 7,107,774 B2 | 9/2006 | Radovich | |

(Continued)

FOREIGN PATENT DOCUMENTS

| | | |
|---|---|---|
| CN | 101713334 A | 5/2010 |
| EP | 0 887 530 A2 | 6/1998 |

(Continued)

OTHER PUBLICATIONS

Office Action (First Office Action) issued on Feb. 28, 2015, by the State Intellectual Property Office of People's Republic of China in corresponding Chinese Patent Application No. 201210330022.5 and an English Translation of the Office Action. (16 pages).

(Continued)

*Primary Examiner* — Phutthiwat Wongwian
*Assistant Examiner* — Marc Amar
(74) *Attorney, Agent, or Firm* — Buchanan Ingersoll & Rooney PC

(57) ABSTRACT

A reliable and flexible black start network restoration for a combined cycle power plant can be achieved by synchronizing a steam turbine and ramping that steam turbine up to an operating point where a maximum power increase is achieved. The resulting steam turbine load change can be compensated by the gas turbine. The increase in the demanded load can be provided by the steam turbine. The load of the steam turbine can also be gradually reduced to increase its load-increasing capacity.

20 Claims, 3 Drawing Sheets

(56) References Cited

U.S. PATENT DOCUMENTS

| | | | |
|---|---|---|---|
| 7,966,102 B2* | 6/2011 | Kirchhof et al. | 700/287 |
| 2004/0045299 A1* | 3/2004 | Blatter et al. | 60/772 |
| 2006/0032232 A1 | 2/2006 | Takai et al. | |
| 2007/0130952 A1 | 6/2007 | Copen | |
| 2008/0272597 A1 | 11/2008 | Althaus | |
| 2009/0064656 A1 | 3/2009 | Oomens et al. | |
| 2009/0320493 A1 | 12/2009 | Olia et al. | |

FOREIGN PATENT DOCUMENTS

| | | |
|---|---|---|
| EP | 1736638 A1 | 12/2006 |
| EP | 2056421 A2 | 5/2009 |
| GB | 932718 | 7/1963 |
| JP | 2005232966 A | 9/2005 |
| RU | 220050 C2 | 3/2003 |
| RU | 2312229 C2 | 12/2007 |
| WO | 2006097495 A2 | 9/2006 |
| WO | 2010072524 A2 | 7/2010 |

OTHER PUBLICATIONS

Yuanwang G et al., "Automatic Derivation and Assessment of Power System Black-Start Schemes", Automation of Electric Power Systems, China, vol. 28 No. 13, Jul. 10, 2004, pp. 50-54, p. 84.

* cited by examiner

US 9,328,668 B2

COMBINED CYCLE POWER PLANT BLACK START METHOD WHERE STEAM TURBINE PROVIDES INCREASE IN DEMANDED LOAD

CROSS-REFERENCE TO RELATED APPLICATIONS

The present application claims benefit under 35 USC §119 to European Patent Application No. 11180391.2, filed Sep. 7, 2011, the entire contents of which are incorporated herein by reference as if fully set forth.

FIELD OF THE INVENTION

The present invention relates to the field of power plant technology. It refers to a method for operating a combined cycle power plant.

BACKGROUND

In the event of a total breakdown of an electrical transmission system (AC network), selected power-generating units have the capability for restoring the network. On account of the very limited size of the network, it is very difficult, however, to maintain the balance between power generation and power consumption. As a consequence thereof, frequency changes occur, which are considerable compared with the normal conditions for the network operation.

Independently of the type of plant which is provided and set up for carrying out such a black start, the capability for accepting the immediate satisfaction of demand blocks, which lie typically within the range of 30-50 MW, is required. The power-generating unit must be in the position to control the frequency and voltage level within acceptable limits when satisfying such blocks.

Large power plants are particularly suitable for the restoration of networks. An example of such a suitable power plant is a combined cycle power plant, as is shown schematically and greatly simplified in FIG. 1. The combined cycle power plant 10 of FIG. 1 comprises a gas turbine 11 and a water-steam cycle 12 which are interlinked via a heat restoration steam generator 13. The gas turbine 11 draws in air 19 by a compressor 15, compresses this, and discharges it to a combustion chamber 16, to which a fuel 20 is fed. The fuel 20 is combusted with the aid of the compressed air and produces a hot gas which is expanded in a subsequent turbine 17, performing work. In the process, the turbine 17 drives the compressor 15 on one side and, on the other side, drives a generator 18 which generates alternating current or alternating voltage. The flue gas 21 which issues from the turbine 17 is directed through the heat restoration steam generator 13 and discharges it to the environment via a flue gas stack 22.

Arranged in the heat restoration steam generator 13 is an evaporator 27 of the water-steam cycle 12 in which the water delivered by a feedwater pump 26 is evaporated. The steam which is produced is expanded in a steam turbine 23, performing work, and drives an additional generator 24 for current or voltage generation. The steam which issues from the steam turbine 23 is condensed in a condenser 25 and, completing the cycle, is fed to the feedwater pump 26.

The current (alternating current) which is generated by the generators 18 and 24 is fed into an AC network 28 which is connected to the combined cycle power plant 10. A control unit 14 ensures that the requirements of the AC network 28 are fulfilled as far as possible in the process with regard to frequency and level of output.

A method for the primary control of a combined cycle power plant operating on the network is generally known from printed publication US 2009/0320493 A1, in which by the corresponding operation of a valve which acts upon the steam turbine a reserve power of the steam turbine is constantly held in readiness in order to boost the network frequency in the event of a frequency drop in the network. The case of a black start is not taken into consideration in this case.

In the case of gas-turbine modules of a combined cycle power plant, the transient operation of the gas turbine can lead to significant changes in the exhaust temperature. This generally necessitates the arrangement of a bypass stack. This can be an important point when judging whether a gas-turbine module of a combined cycle power plant is suitable for a black start or not.

Modern high-performance gas turbines are particularly well-suited for network restoration. The flexibility during the operation of these machines within the range of low outputs, however, is restricted in general by process limitations. In the general case, an individual unit cannot therefore fulfill the aforesaid requirements for the entire operating range.

SUMMARY OF THE INVENTION

The present disclosure is directed to a method for operating a combined cycle power plant, which includes a gas turbine and a steam turbine which, via a connected electric generator, generate alternating voltage of an assigned frequency and deliver the alternating voltage to an AC network. Flue gas of the gas turbine is used for producing steam for the steam turbine, for network restoration, during a black start. The method includes:

a) supplying, in island mode, internal consumers by the gas turbine, an operating point of the gas turbine is selected so that a minimum steam temperature is achieved for the steam turbine;

b) synchronizing and ramping up the steam turbine, in island mode, to an operating point at which a maximum power increase can be achieved, the resulting load change of the steam turbine is compensated by the gas turbine and a network-side power consumption corresponds to zero MW;

c) connecting consumer loads block by block;

d) providing the increase in the demanded load, by the steam turbine;

e) reducing the load of the steam turbine gradually for increasing its load-increasing capacity; and f) repeating steps c) to e) until the base load of the combined cycle power plant (10) is achieved.

BRIEF DESCRIPTION OF THE DRAWINGS

The invention shall subsequently be explained in more detail based on exemplary embodiments in conjunction with the drawings. In the drawings.

DETAILED DESCRIPTION OF THE PREFERRED EMBODIMENTS

Introduction to the Embodiments

Figure 1:
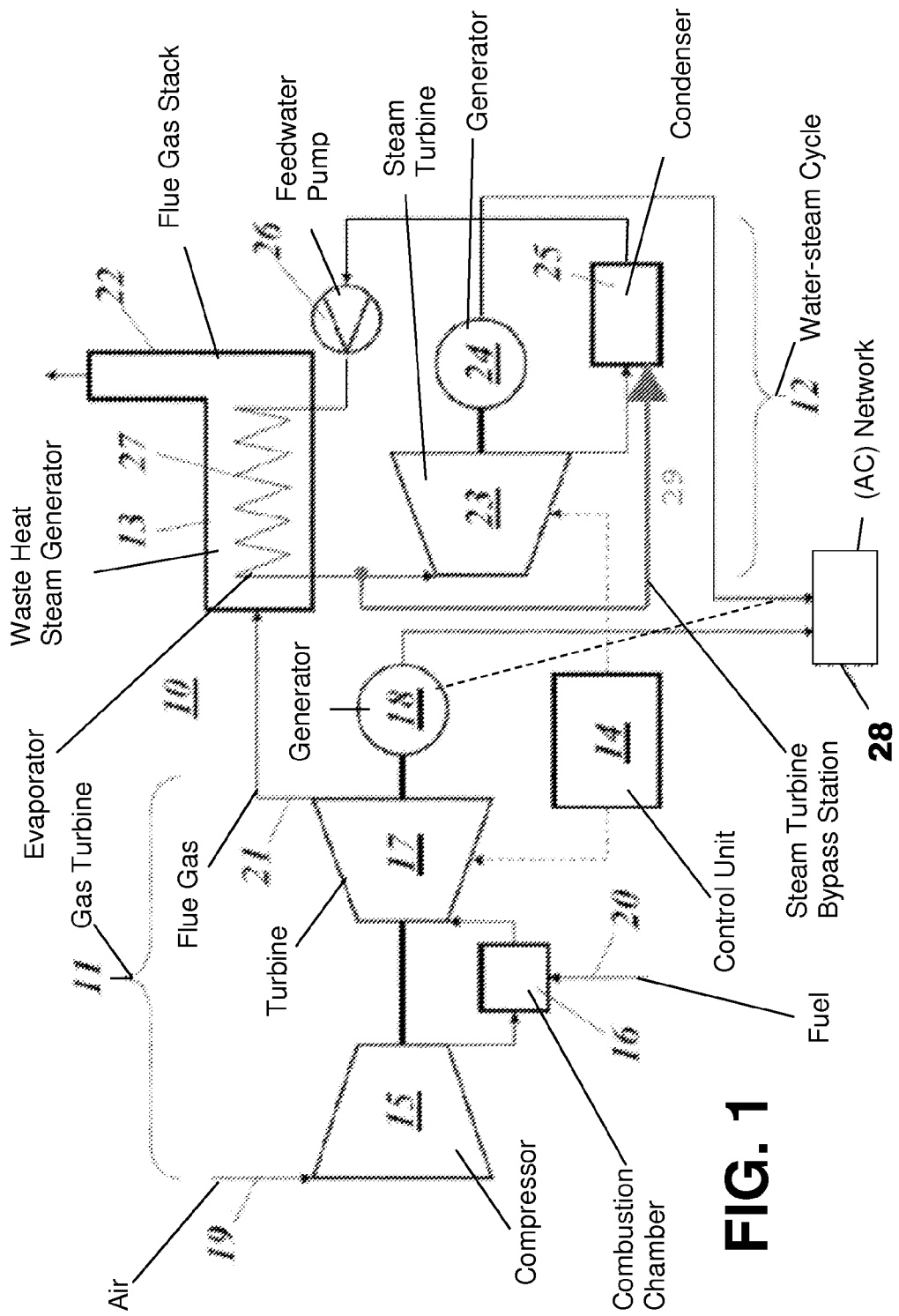
FIG. 1 shows the principle construction of a combined cycle power plant, as is suitable for implementing the method according to the invention.

It is therefore an object of the invention to disclose a method for operating a combined cycle power plant with which network restoration can be achieved in a simple and reliable manner.

The object is achieved by means of the appended claims.

The invention relates to a method for operating a combined cycle power plant, which comprises a gas turbine and a steam turbine which, via a connected electric generator in each case, generate alternating voltage of an assigned frequency and deliver it to an AC network, wherein the flue gas of the gas turbine is used for producing steam for the steam turbine.

According to the method, for network restoration during a black start, in a first step, in island mode, internal consumers are supplied by the gas turbine, wherein the operating point of the gas turbine is selected so that a minimum steam temperature is achieved for the steam turbine, in a second step, in island mode, the steam turbine is synchronized and ramped up to an operating point at which a maximum power increase can be achieved, wherein the resulting load change of the steam turbine is compensated by the gas turbine, in a third step, consumer loads are connected block by block, in a fourth step, the increase in the demanded load is provided totally or partially and permanently or temporarily by the steam turbine, in a fifth step, the load of the steam turbine is gradually reduced for increasing its load-increasing capacity, and steps three to five are repeated until the base load of the combined cycle power plant is achieved.

In one embodiment of the method according to the invention, in the first step, provision is made for the minimum steam temperature, which is determined or controlled on account of the rotor temperature of the steam turbine and by an optimum operating point of the gas turbine which allows a corresponding exhaust temperature of the gas-turbine flue gases.

When stationary, the rotor of the steam turbine cools down more slowly than the steam turbine casing. If the steam turbine is ramped up again after being stationary and after the corresponding cooling down, it is necessary for the steam temperature to be at a sufficiently high level during the restarting so that thermally induced damage cannot occur. A correspondingly adjusted steam temperature, especially a correspondingly minimum temperature, can avoid excessive cooling down of the casing and in the process prevent the blades from coming into contact with the stator and the blade tips being damaged. A minimum steam temperature for the casing can consequently be provided by the gas turbine being run at an operating point so that the flue gases when discharging from the gas turbine, and therefore entering the waste heat boiler, are sufficiently high so as to allow such a minimum steam temperature. In order to bring about such a steam temperature, one of a large number of optimum operating points for the gas turbine can be selected. Depending upon the type of gas turbine, an operating point can be established, inter alia, by means of parameters such as fuel quantity, air feed temperature or guide wheel adjustments.

In another embodiment, in the second step, the total output power is used for the station service of the combined cycle power plant and, depending upon the optimum operating point of the gas turbine, the steam turbine alone, or the steam turbine and the gas turbine together, or the gas turbine alone, provides the power for the internal consumers.

According to another embodiment, the surplus power in island mode, which cannot be used by the internal consumers, can be used for operating the gas-turbine compressor (15).

In another embodiment, in island mode of the power plant (10) the current generated by generators (18, 24) connected to an alternating current network corresponds to zero.

In a further embodiment, in the fourth step, the demanded load is provided totally by the steam turbine, or the gap between a demanded load and the total reaction of the gas turbine is covered by the steam turbine. Gas turbines do not react with equal speed in comparison to steam turbines, depending on the operating point, during the load increase. A steam turbine can react with sufficient speed in any case in order to realize a sharp load increase. Therefore, the operation of the steam turbine alone can realize the total load increase.

A gas turbine can also react quickly, wherein the degree of speed of the gas turbine in certain load ranges, mostly in low load ranges, is limited on account of the operating stability. It must also be operated, however, so as to observe, for example, emissions limit values, which in lower load ranges limits the operating range of the gas turbine. If a sharper and quicker load increase is demanded and only the gas turbine is operated, a gap between demanded load increase and load increase realized by means of the gas turbine can be formed. This gap can be covered in this case by means of the additional operation of the steam turbine.

In yet another embodiment of the invention, as a result of a permanent provision of the demanded load by the steam turbine, the load ranges of the gas turbine operation which are restricted by process or emissions limits are avoided.

According to another embodiment, the steam turbine is operated so that both the possibility of load increasing and of load decreasing of the steam turbine is provided.

In a further embodiment, a minimum load of the steam turbine is maintained in such a way that in the case of single-shaft configurations opening of the coupling, or in the case of multishaft configurations opening of the generator circuit-breaker, is avoided.

DETAILED DESCRIPTION

The method according to the invention is based on a tuned controlling of gas turbine and steam turbine over the entire operating range of the plant (from station service up to base load). The method is suitable in this case both for single-shaft plants and for multishaft plants and provides the following advantages:

Larger demand blocks can be connected. The contribution of the steam turbine compensates in this case for possible limitations for the gas turbine operation in the load range in the event of process engineering limitations, and flue gas-induced limitations.

On account of the superior dynamic characteristics of the steam turbine, improved control stability is created.

A capacity of the network restoration which extends up to the base load of the combined cycle power plant is created.

A bypass stack is not necessary because excessive fluctuations in the gas temperature can be avoided.

Figure 2:
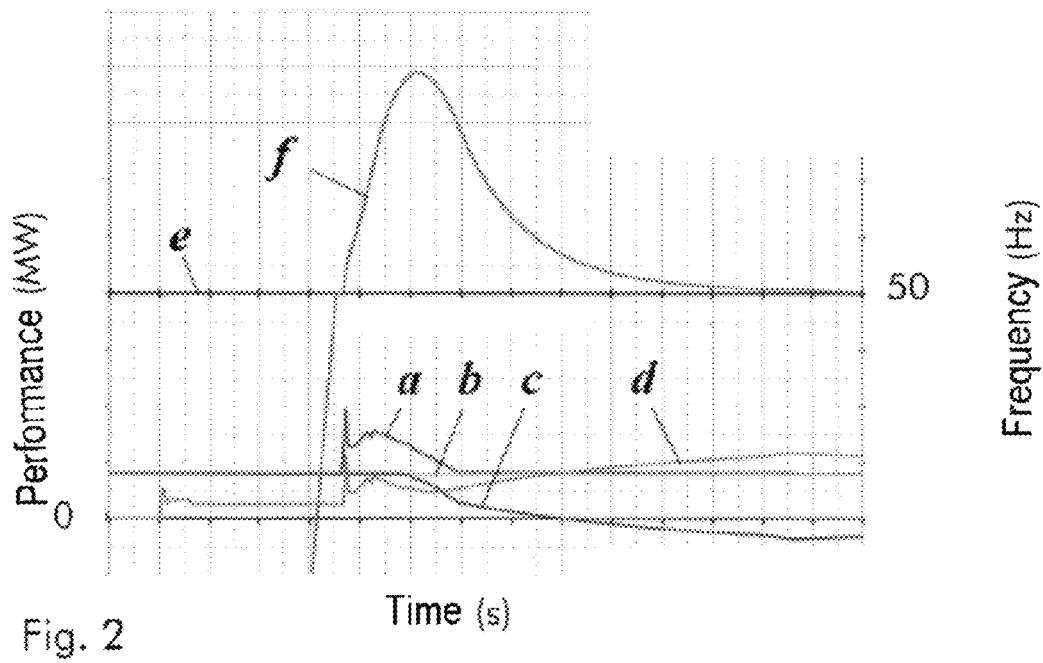
FIG. 2 shows different time curves during the synchronization of the steam turbine of a combined cycle power plant during a black start according to an exemplary embodiment of the method according to the invention.

The types of operation of the combined cycle power plant within the scope of the invention shall subsequently be explained in more detail with reference to FIGS. 2-5. FIG. 2 relates in this case to the synchronization of the steam turbine, wherein in the figure—as well as in the other figures—power outputs (in megawatts) over time (in seconds) are plotted on the left-hand scale, and the frequency (in Hz) over time (in seconds) is plotted on the right-hand scale. The curve (a) (in FIGS. 2-5) represents the time characteristic of the thermal power of the combined cycle power plant (CC PWR THERM), the curve (b) represents the corresponding power consumption (LOAD CONSUMPTION), the curve (c) represents the corresponding thermal power of the gas turbine (GT PWR THERM), the curve (d) represents the corresponding thermal power of the steam turbine (ST PWR THERM), the curve (e) represents the corresponding frequency of the gas turbine (FREQ GT) and the curve (f) represents the corresponding frequency of the steam turbine (FREQ ST).

The starting point of the operation according to FIG. 2 is the island mode of the gas turbine, by means of which only the internal consumers are supplied (constant station service according to curve (b)). The steam which is produced is discharged by means of ST bypass stations (29) directly into the condenser. The operating point of the gas turbine is selected so that a minimum steam temperature for the operation of the steam turbine is achieved. The necessary steam temperature is primarily determined by the rotor temperature of the steam turbine.

The steam turbine is synchronized ("synchronization of ST" in FIG. 2) and is ramped up in power according to curve (d) to an ideal operating point for the connection of a first block of consumer loads (this is generally the point with the maximum steam-turbine load increase capacity). The total active output power of the plant (curve (b)) remains at the level of the station service (the net power delivery to the network is zero—that is to say zero-power operation). The steam turbine then supplies the internal consumers with power and, if necessary, supplies the compressor of the gas turbine with power, whereas the power of the gas turbine is ramped down ("negative GT power output" of the curve (c); the constant curve (b) represents the internal consumption, the total thermal power (a) is the sum of the thermal gas-turbine power (c) and the thermal steam-turbine power (d)).

Figure 3:
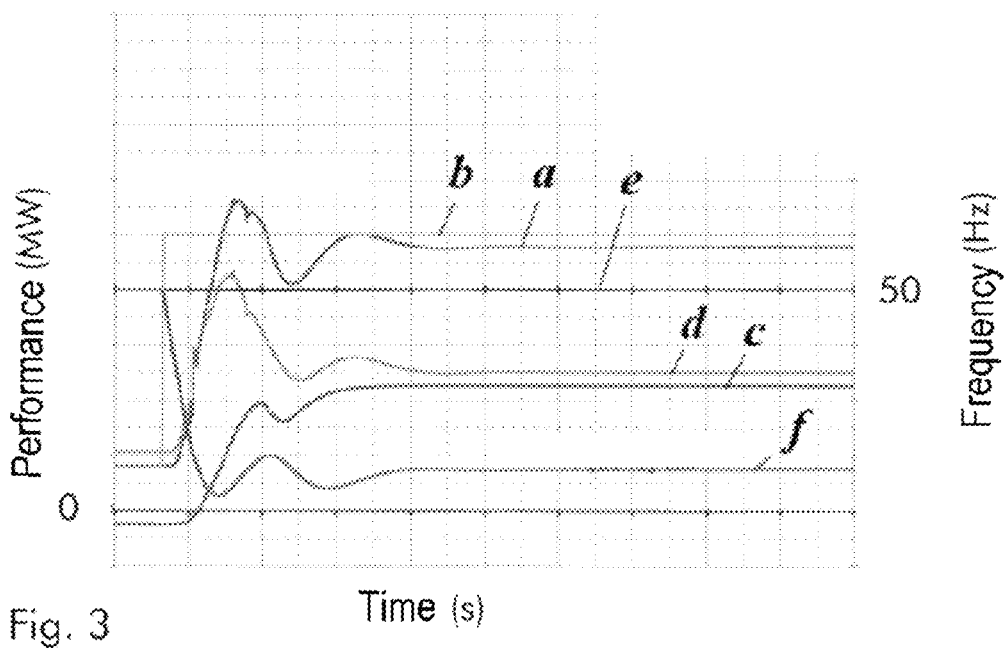
FIG. 3 shows different time curves when a load block is being connected to a combined cycle power plant according to an exemplary embodiment of the method according to the invention.

FIG. 3 relates to the connection of load blocks. After the connection of a block of consumer loads (step-like increase ("consumer load step") in curve (b)), the gas turbine and the steam turbine react at the same time to the frequency change associated therewith (at the start, this is a "frequency fall"; curve (f)). The coordination of both turbines is subject to the following characteristics:

The general procedure is with some adjustments in the same way as has been described in printed publication US 2009/0320493 A1, the contents of which are incorporated herein by reference as if fully set forth. The deviation between load setpoint value and the response of the gas turbine which is estimated and approximated by model computations is compensated by the contribution of the steam turbine. Depending upon the operating point of the plant, the steam turbine provides the increment in the load demand—totally or partially—on a temporally limited or permanent basis. The temporally limited contribution bridges the gap between the connection of a load block and the total reaction of the gas turbine. The permanent contribution serves for avoiding load ranges with restricted gas turbine operation (process-induced or emissions-induced limitations).

The contribution of the steam turbine first and foremost improves the dynamic response of the power-generating unit. This is particularly important for load ranges with limited reaction dynamics of the gas turbine (typically during low load operation). Therefore, the gas turbine is to be operated so that capacity of the steam turbine for a load increase as well as for a load reduction is available.

A minimum steam turbine load is always to be maintained in order to avoid opening of the coupling (in the case of single-shaft configurations), or opening of the generator circuit-breaker (in the case of multishaft configurations).

Figure 4:
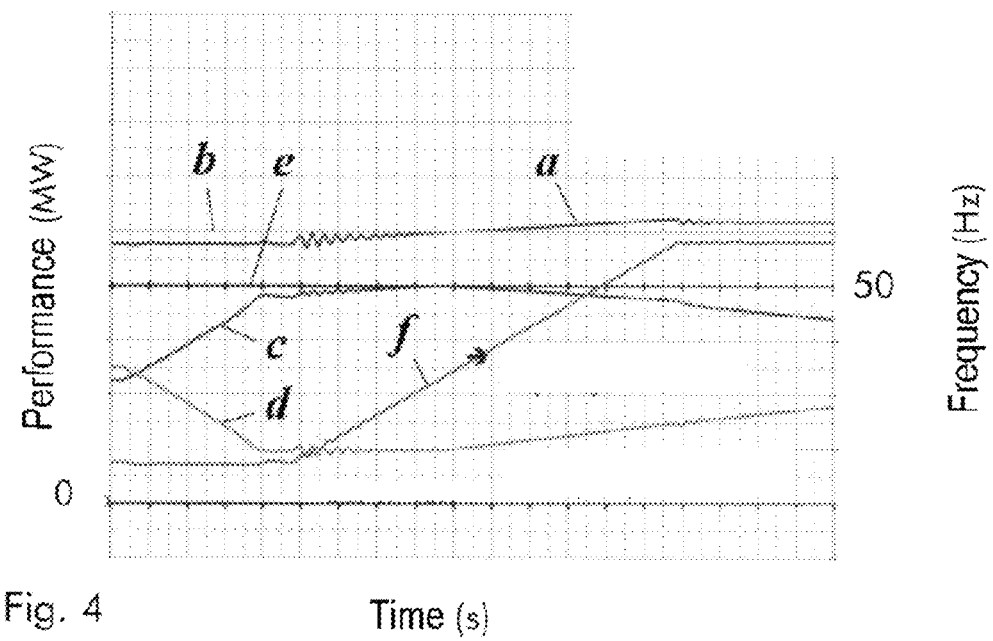
FIG. 4 shows different time curves during the stabilization of a combined cycle power plant after the connection of a load block according to an exemplary embodiment of the method according to the invention.

FIG. 4 relates to stabilization after connection of the load blocks. After frequency stabilization, the plant is prepared for the connection of the next block of consumer loads (according to FIG. 5). Except for ranges of a limited operation, the gas turbine maintains the required power. The steam turbine load is gradually reduced (curve (d)) and consequently its capacity for a load increase is increased. The subsequent limits are created for the reduction of the steam turbine load:

A minimum capacity for load reductions must be made available in order to maintain the system stability (operating ranges with limited reaction capability of the gas turbine).

A minimum steam turbine load ("min. ST load" in curve (d)) must be maintained in order to avoid opening of the coupling (in the case of single-shaft configurations), or opening of the generator circuit-breaker (in the case of multishaft configurations).

It may be possible that the steam turbine has to cover a portion of the demanded consumer load for an extended period of time in order to avoid load ranges which are critical for the continuous running operation of the gas turbine. A controlled bypass operation is necessary for this case.

The steam turbine is ramped up as soon as the predetermined capacity for the transient load increase is reached ("max. ST load increase capacity reached" in curve (d); FIG. 4)).

Figure 5:
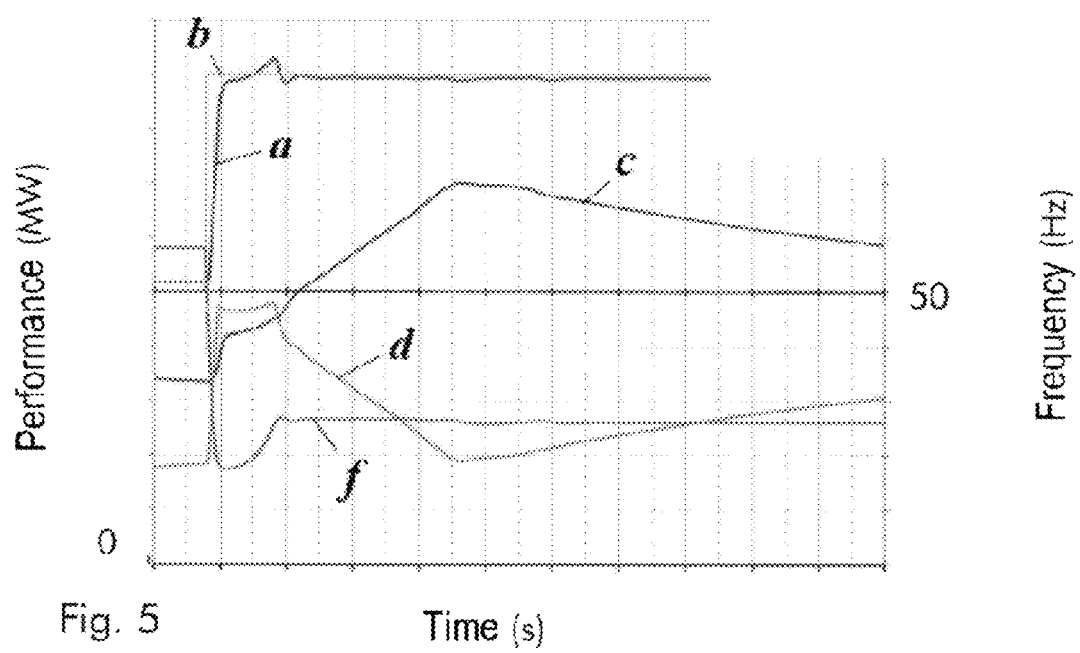
FIG. 5 shows the further connection of a load block and the time curves associated therewith.

With the connection of a further load block according to FIG. 5, the steam turbine reacts immediately (curve (d)). The gas turbine follows with some delay (curve (c)), wherein the steam turbine is throttled back again as gas turbine power increases.

The connection of load blocks and the subsequent stabilization according to FIGS. 3-5 are repeated consecutively until the base load of the combined cycle power plant is achieved.

It is understood, therefore, that this invention is not limited to the particular embodiments disclosed, but is intended to cover all modifications which are within the spirit and scope of the invention as defined by the appended claims; the above description; and/or shown in the attached drawings.

LIST OF DESIGNATIONS

10 Combined cycle power plant
11 Gas turbine
12 Water-steam cycle
13 Waste heat steam generator
14 Control unit
15 Compressor
16 Combustion chamber
17 Turbine
18, 24 Generator
19 Air
20 Fuel
21 Flue gas
22 Flue gas stack
23 Steam turbine
25 Condenser
26 Feedwater pump
27 Evaporator
28 (AC) network
29 Steam-turbine (ST) bypass station

What is claimed is:

1. A method for operating a combined cycle power plant during a black start, the combined cycle power plant comprising a gas turbine and a steam turbine that generate alternating voltage of an assigned frequency and deliver the alternating voltage to an AC network via an electric generator connected to the gas turbine and an electric generator connected to the steam turbine, wherein flue gas of the gas turbine is used for producing steam for the steam turbine for network restoration, the method comprising:
   a) supplying internal consumers by the gas turbine in island mode, an operating point of the gas turbine being set for such supplying such that a minimum steam temperature is achieved for the steam turbine;
   b) synchronizing and ramping up the steam turbine in island mode to an operating point at which a maximum power increase is achievable, a load change of the steam turbine created from the internal consumers being compensated for by the gas turbine such that a network-side power consumption corresponds to zero MW;
   c) connecting consumer loads block by block;
   d) providing power for an increase in demanded load from the connected consumer loads via the steam turbine;
   e) reducing a load of the steam turbine gradually while increasing a load on the gas turbine to maintain power output from the combined cycle power plant such that load-increasing capacity of the steam turbine is increased such that a subsequent change to steam turbine operations is actuatable to accommodate an increase in load at a later time; and
   f) repeating steps c) to e) until a base load of the combined cycle power plant is achieved.

2. The method as claimed in claim 1, wherein in step a) provision is made for the minimum steam temperature which is determined or regulated on account of a rotor temperature of the steam turbine and by an optimum operating point of the gas turbine.

3. The method as claimed in claim 1 wherein in step b) total output power is used for the station service of the combined cycle power plant such that the steam turbine alone, or the steam turbine and the gas turbine together, or the gas turbine alone, provides power for the internal consumers based upon an optimum operating point for the gas turbine.

4. The method as claimed in claim 1, wherein in step b) surplus power available via operation of the steam turbine and the generator connected to the steam turbine that cannot be used by any internal consumer as the combined power plant operates in island mode is used for operating a compressor of the gas turbine.

5. The method as claimed in claim 1, wherein in steps a) and b), in island mode of the power plant the current generated by generators connected to an alternating current network corresponds to zero.

6. The method as claimed in claim 1, wherein in step d) the demanded load is provided by a coordinated and simultaneous reaction of the gas turbine, the steam turbine, and one or more bypass stations that are configured to discharge steam from an evaporator to a condenser such that a portion of steam from the evaporator bypasses the steam turbine, and wherein network frequency is selectively controlled by the gas turbine or the steam turbine.

7. The method as claimed in claim 1, wherein in step d) the demanded load is provided totally by the steam turbine.

8. The method as claimed in claim 1, wherein as a result of a permanent provision of the demanded load by the steam turbine the load ranges of the gas turbine operation which is restricted by process or emissions limitations are avoided.

9. The method as claimed in claim 1, wherein the steam turbine is operated so that both the possibility of a load increase and of a load decrease of the steam turbine is provided.

10. The method as claimed in claim 1, wherein a minimum load of the steam turbine is maintained in such a way that in the case of single-shaft configurations opening of the coupling, or in the case of multishaft configurations opening of the generator circuit-breaker, is avoided.

11. The method as claimed in claim 1, wherein the minimum steam temperature is determined based on a rotor temperature of the steam turbine.

12. The method as claimed in claim 1, comprising:
   controlling the minimum steam temperature based on a rotor temperature of the steam turbine and by an optimum operating point of the gas turbine that allows a corresponding exhaust temperature of the flue gas of the gas turbine.

13. The method as claimed in claim 1, wherein in step d) the demanded load is provided by the steam turbine so that a gap between a demanded load and a total reaction of the gas turbine is covered by the steam turbine.

14. The method as claimed in claim 1, wherein in step d) the demanded load is provided by a coordinated and simultaneous reaction of the gas turbine, the steam turbine, and at least one bypass station, each bypass station being configured such that steam from an evaporator of a waste heat steam generator bypasses the steam turbine and is sent directly to a condenser that condenses steam for sending the condensed steam to the evaporator of the waste heat steam generator.

15. The method as claimed in claim 14, wherein network frequency is selectively controlled by the gas turbine or the steam turbine.

16. A method for operating a combined cycle power plant during a black start, the combined cycle power plant comprising a gas turbine and a steam turbine that generate alternating voltage of an assigned frequency and deliver the alternating voltage to an AC network via an electric generator connected to the gas turbine and an electric generator connected to the steam turbine, wherein flue gas of the gas turbine is used for producing steam for the steam turbine for network restoration, the method comprising:
   a) supplying steam to the steam turbine via operation of the gas turbine in island mode during the black start, an operating point of the gas turbine being set for such supplying such that a minimum steam temperature is achieved for the steam turbine;
   b) synchronizing and ramping up the steam turbine in island mode to an operating point at which a maximum power increase is achievable, a load change of the steam turbine created from internal consumers being compensated for by the gas turbine ramping down while the steam turbine is ramped up while a network-side power consumption corresponds to zero MW during the black start;
   c) connecting consumer loads block by block; and
   d) providing power for an increase in the demanded load created via the connecting of the consumer loads via the steam turbine.

17. The method of claim 16, comprising:
   e) after the consumer loads are connected, reducing the load of the steam turbine gradually such that load-increasing capacity of the steam turbine is increased such that a subsequent change to steam turbine operations is actuatable to accommodate an increase in load at a later time; and f) during the gradual reduction of load of the steam turbine, increasing load of the gas turbine to maintain power output.

18. The method of claim 17, comprising:

controlling the minimum steam temperature based on a rotor temperature of the steam turbine and by an optimum operating point of the gas turbine that allows a corresponding exhaust temperature of the flue gas of the gas turbine.

19. The method of claim 16, comprising:

e) after a first block of the consumer loads are connected:
   reducing the load of the steam turbine such that load-increasing capacity of the steam turbine is increased such that a subsequent change to steam turbine operations is actuatable to accommodate an increase in load at a later time, and
   during the reduction of load of the steam turbine, increasing load of the gas turbine to maintain power output for frequency stabilization.

20. The method of claim 19, comprising:

f) after a second block of the consumer loads are connected:
   reducing the load of the steam turbine such that load-increasing capacity of the steam turbine is increased such that a subsequent change to steam turbine operations is actuatable to accommodate an increase in load at a later time, and
   during the reduction of load of the steam turbine, increasing load of the gas turbine to maintain power output for frequency stabilization.

* * * * *